United States Patent
Chae et al.

(10) Patent No.: US 9,590,786 B2
(45) Date of Patent: Mar. 7, 2017

(54) METHOD AND APPARATUS FOR TRANSMITTING ACKNOWLEDGEMENT IN WIRELESS COMMUNICATION SYSTEM

(71) Applicant: LG ELECTRONICS INC., Seoul (KR)

(72) Inventors: Hyukjin Chae, Anyang-si (KR); Hanbyul Seo, Anyang-si (KR); Seungmin Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/431,245

(22) PCT Filed: Oct. 14, 2013

(86) PCT No.: PCT/KR2013/009156
§ 371 (c)(1),
(2) Date: Mar. 25, 2015

(87) PCT Pub. No.: WO2014/058286
PCT Pub. Date: Apr. 17, 2014

(65) Prior Publication Data
US 2015/0244510 A1    Aug. 27, 2015

Related U.S. Application Data

(60) Provisional application No. 61/713,617, filed on Oct. 14, 2012, provisional application No. 61/718,687, filed on Oct. 25, 2012.

(51) Int. Cl.
*H04L 5/00* (2006.01)
*H04B 7/26* (2006.01)
*H04W 72/02* (2009.01)
*H04W 72/04* (2009.01)

(52) U.S. Cl.
CPC .............. *H04L 5/0055* (2013.01); *H04B 7/26* (2013.01); *H04W 72/02* (2013.01); *H04W 72/042* (2013.01); *H04W 72/0413* (2013.01)

(58) Field of Classification Search
CPC .................................................... H04L 5/0055
See application file for complete search history.

(56) References Cited

U.S. PATENT DOCUMENTS

| 2013/0114530 A1* | 5/2013 | Chen ................... H04W 72/042 370/329 |
| 2013/0230017 A1* | 9/2013 | Papasakellariou H04W 72/0406 370/330 |

(Continued)

FOREIGN PATENT DOCUMENTS

| WO | 2012/099368 | 7/2012 |
| WO | 2012/118356 | 9/2012 |

OTHER PUBLICATIONS

Samsung, "HARQ-ACK PUCCH Resources in Response to E-PDCCH Detections," 3GPP TSG RAN WG1 #68bis, R1-121647, Mar. 2012, 2 pages.

(Continued)

*Primary Examiner* — Jason Mattis
(74) *Attorney, Agent, or Firm* — Lee, Hong, Degerman, Kang & Waimey

(57) ABSTRACT

The method for transmitting an acknowledgement for enhanced physical downlink control channel (EPDCCH) by a terminal in a wireless communication system according to one embodiment of the present invention comprises: a step of receiving EPDCCH; and a step of determining a resource for transmitting the acknowledgement based on one or more of the values related to the enhanced control channel element (ECCE) index which is the lowest from among the indices of ECCEs used in the EPDCCH transmission, an antenna port index, and a predetermined value indicated by (Continued)

downlink control information. The transmitting acknowledgement method determines whether to use the predetermined value indicated by the downlink control information when the resource for transmitting the acknowledgement is determined, based on one or more of the transmitted EPDCCH type, the size of an DCI format, information related to the physical resource block (PRB) set of the transmitted EPDCCH, and the type of the signal transmitted on the PDSCH indicated by the EPDCCH.

20 Claims, 9 Drawing Sheets

(56) References Cited

U.S. PATENT DOCUMENTS

| | | | | |
|---|---|---|---|---|
| 2013/0242882 A1* | 9/2013 | Blankenship | ....... | H04W 72/042 370/329 |
| 2013/0242890 A1* | 9/2013 | He | ....... | H04L 5/1469 370/329 |
| 2015/0092728 A1* | 4/2015 | Wang | ....... | H04L 5/0048 370/329 |
| 2015/0195822 A1* | 7/2015 | Han | ....... | H04L 5/0055 370/329 |

OTHER PUBLICATIONS

NTT DOCOMO, "Views on PUCCH Resource Allocation for EPDCCH," 3GPP TSG RAN WG1 Meeting #70, R1-123554, Aug. 2012, 4 pages.
Sharp, "Remaining aspects of PUCCH resource for EPDCCH," 3GPP TSG RAN WG1 Meeting #70bis, R1-124338, Oct. 2012, 10 pages.
LG Electronics, "PUCCH A/N resource allocation for EPDCCH," 3GPP TSG RAN WG1 Meeting #71, R1-125241, Nov. 2012, 6 pages.
PCT International Application No. PCT/KR2013/009156, Written Opinion of the International Searching Authority dated Jan. 24, 2014, 15 pages.
Catt, "PUCCH resource for E-PDCCH," 3GPP TSG RAN WG1 Meeting #70bis, R1-124107, Oct. 2012, 3 pages.
Texas Instruments, "Outstanding aspects of PUCCH resource allocation for EPDCCH," Minnie53GPP TSG RAN WG1 #70bis, R1-124141, Oct. 2012, 2 pages.
NTT DOCOMO, "Views on PUCCH Resource Allocation for EPDCCH," 3GPP TSG RAN WG1 Meeting #70bis, R1-124258, Oct. 2012, 4 pages.
HTC, "Remaining issues on PUCCH A/N resource allocation for EPDCCH," 3GPP TSG RAN WG1 #70bis, R1-124356, Oct. 2012, 3 pages.
PCT International Application No. PCT/KR2013/009156, Written Opinion of the International Searching Authority dated Jan. 24, 2014, 13 pages.
European Patent Office Application No. 13845505.0, Search Report dated May 31, 2016, 7 pages.
"3rd Generation Partnership Project: Technical Specification Group Radio Access Network; Evolved Universal Terrestrial Radio Access (E-UTRA); Physical layer procedure" 3GPP Standard; 3GPP TS 36.213, vol. RAN WG1, No. V11.0.0, Sep. 18, 2012, 143 pages.

* cited by examiner

FIG. 9
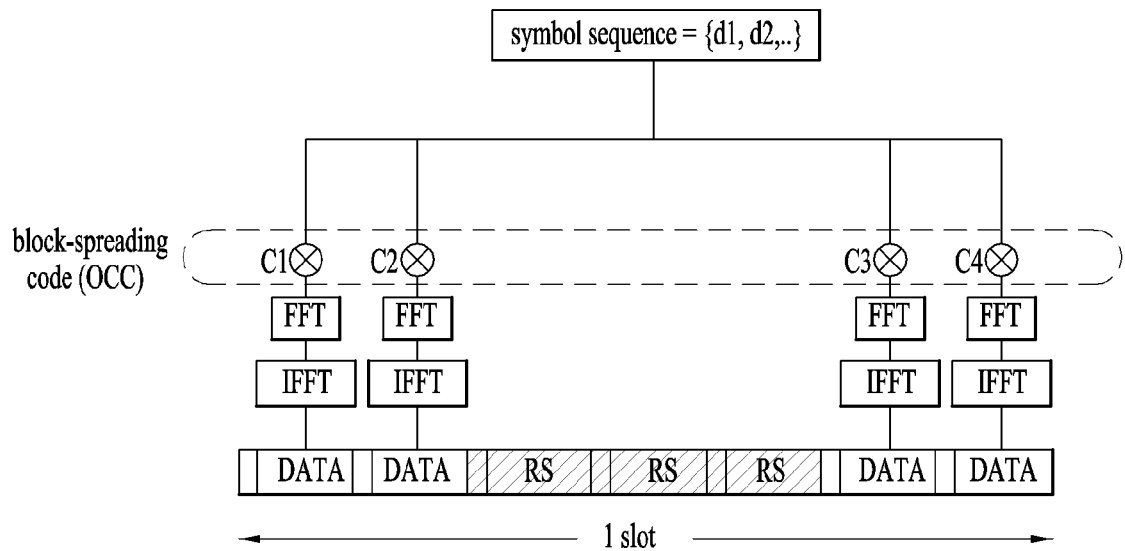
(a)
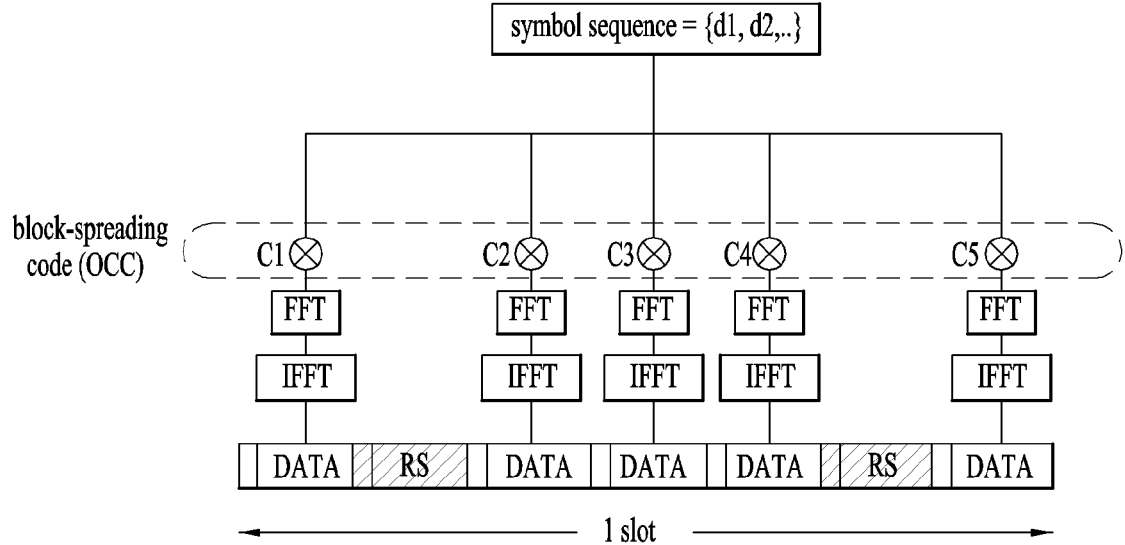
(b)

METHOD AND APPARATUS FOR TRANSMITTING ACKNOWLEDGEMENT IN WIRELESS COMMUNICATION SYSTEM

CROSS-REFERENCE TO RELATED APPLICATIONS

This application is the National Stage filing under 35 U.S.C. 371 of International Application No. PCT/KR2013/009156, filed on Oct. 14, 2013, which claims the benefit of U.S. Provisional Application Ser. No. 61/713,617, filed on Oct. 14, 2012 and 61/718,687, filed on Oct. 25, 2012, the contents of which are all hereby incorporated by reference herein in their entirety.

TECHNICAL FIELD

The present invention relates to a wireless communication system and, more particularly, to a method and apparatus for transmitting acknowledgement when an enhanced physical downlink channel (EPDCCH) is applied.

BACKGROUND ART

Wireless communication systems have been diversified in order to provide various types of communication services such as voice or data service. In general, a wireless communication system is a multiple access system capable of sharing available system resources (bandwidth, transmit power or the like) so as to support communication with multiple users. Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system a Multi Carrier Frequency Division Multiple Access (MC-FDMA) system and the like.

DISCLOSURE

Technical Problem

An object of the present invention devised to solve the problem lies in a method for transmitting acknowledgement when control information is received via an EPDCCH. In particular, a method for efficiently utilizing resources while preventing collision of resources for transmitting acknowledgement is provided.

The technical problems solved by the present invention are not limited to the above technical problems and other technical problems which are not described herein will become apparent to those skilled in the art from the following description.

Technical Solution

The object of the present invention can be achieved by providing a method for transmitting acknowledgement for an enhanced physical downlink control channel (EPDCCH) at a user equipment (UE) in a wireless communication system including receiving the EPDCCH and deciding a resource to be used to transmit the acknowledgement based on one or more of a value related to a lowest enhanced control channel element (ECCE) index among ECCEs used to transmit the EPDCCH, an antenna port index and a predetermined value indicated by downlink control information, wherein whether the predetermined value indicated by the downlink control information is used when deciding the resource to be used to transmit the acknowledgement is determined, according to one or more of a type of the transmitted EPDCCH, the size of a DCI format, information related to an EPDCCH physical resource block (PRB) set, on which the EPDCCH is transmitted, and a type of a signal transmitted on a PDSCH indicated by the EPDCCH.

In another aspect of the present invention, provided herein is a user equipment (UE) apparatus for transmitting acknowledgement for an enhanced physical downlink control channel (EPDCCH) in a wireless communication system including a reception module and a processor, wherein the processor receives the EPDCCH and decides a resource to be used to transmit the acknowledgement based on one or more of a value related to a lowest enhanced control channel element (ECCE) index among ECCEs used to transmit the EPDCCH, an antenna port index and a predetermined value indicated by downlink control information, and wherein whether the predetermined value indicated by the downlink control information when deciding the resource to be used to transmit the acknowledgement is used is determined, according to one or more of a type of the transmitted EPDCCH, the size of a DCI format, information related to an EPDCCH physical resource block (PRB) set, on which the EPDCCH is transmitted, and a type of a signal transmitted on a PDSCH indicated by the EPDCCH.

The aspects of the present invention may include the following features.

The predetermined value indicated by the downlink control information may be any one of values mapped to values of a specific field included in the downlink control information.

If the predetermined value indicated by the downlink control information is used when deciding the resource to be used to transmit the acknowledgement, the mapped values may be differently set according to one or more of an aggregation level or an antenna port index.

The values mapped to the values of the specific field when the aggregation level is large or when the antenna port index is large may include negative values greater in number than the number of negative values included in the values mapped to the values of the specific field when the aggregation level is small or when the antenna port index is small.

If the predetermined value indicated by the downlink control information is used when deciding the resource to be used to transmit the acknowledgement, the value of the lowest ECCE index may be a quotient of the lowest ECCE index divided by an aggregation level.

If the predetermined value indicated by the downlink control information is not used when deciding the resource to be used to transmit the acknowledgement, the value of the lowest ECCE index may be a product of a quotient of the lowest ECCE index divided by an aggregation level and the number of ECCEs per PRB pair.

If the EPDCCH PRB set, on which the EPDCCH is transmitted, is of a distributed type, the predetermined value indicated by the downlink control information may be used when deciding the resource to be used to transmit the acknowledgement.

If the size of the DCI format is greater than a predetermined value, the predetermined value indicated by the downlink control information may be used when deciding the resource to be used to transmit the acknowledgement.

Information related to the EPDCCH PRB set, on which the EPDCCH is transmitted, may include an aggregation level or the number of PRB pairs.

If the aggregation level or the number of PRB pairs is greater than a predetermined value, the predetermined value indicated by the downlink control information may be used when deciding the resource to be used to transmit the acknowledgement.

If the type of the signal transmitted on the PDSCH indicated by the EPDCCH is any one of system information, a paging signal or a random access response, the predetermined value indicated by the downlink control information may not be used when deciding the resource to be used to transmit the acknowledgement.

The resource to be used to transmit the acknowledgement may be determined by the following equation:

$$n_{PUCCH}^{(1)} = N_{PUCCH,n}^{(1)} + f_1(n_{ECCE}) + \delta_{AP} \times k_P + \delta_{ARI} \times n_{ARI} \quad (1)$$

where, $N_{PUCCH,n}^{(1)}$ denotes a start point of a resource index which will be used to transmit the PUCCH for the EPDCCH, $n_{ECCE}$ denotes the lowest ECCE index, $f_1(n_{ECCE})$ denotes the value related to the lowest ECCE index, $k_P$ denotes the antenna port index, $\delta_{AP}$ denotes a value for determining whether the antenna port index is used, $n_{ARI}$ denotes the value indicated by the downlink control information, and $\delta_{ARI}$ denotes a value for determining whether the value indicated by the downlink control information is used.

Advantageous Effects

According to the present invention, it is possible to efficiently utilize resources for acknowledgement while selecting resources used for acknowledgement for a plurality of EPDCCH sets without collision.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 9 is a diagram showing a PUCCH channel structure using block spreading;

BEST MODE

Figure 1:
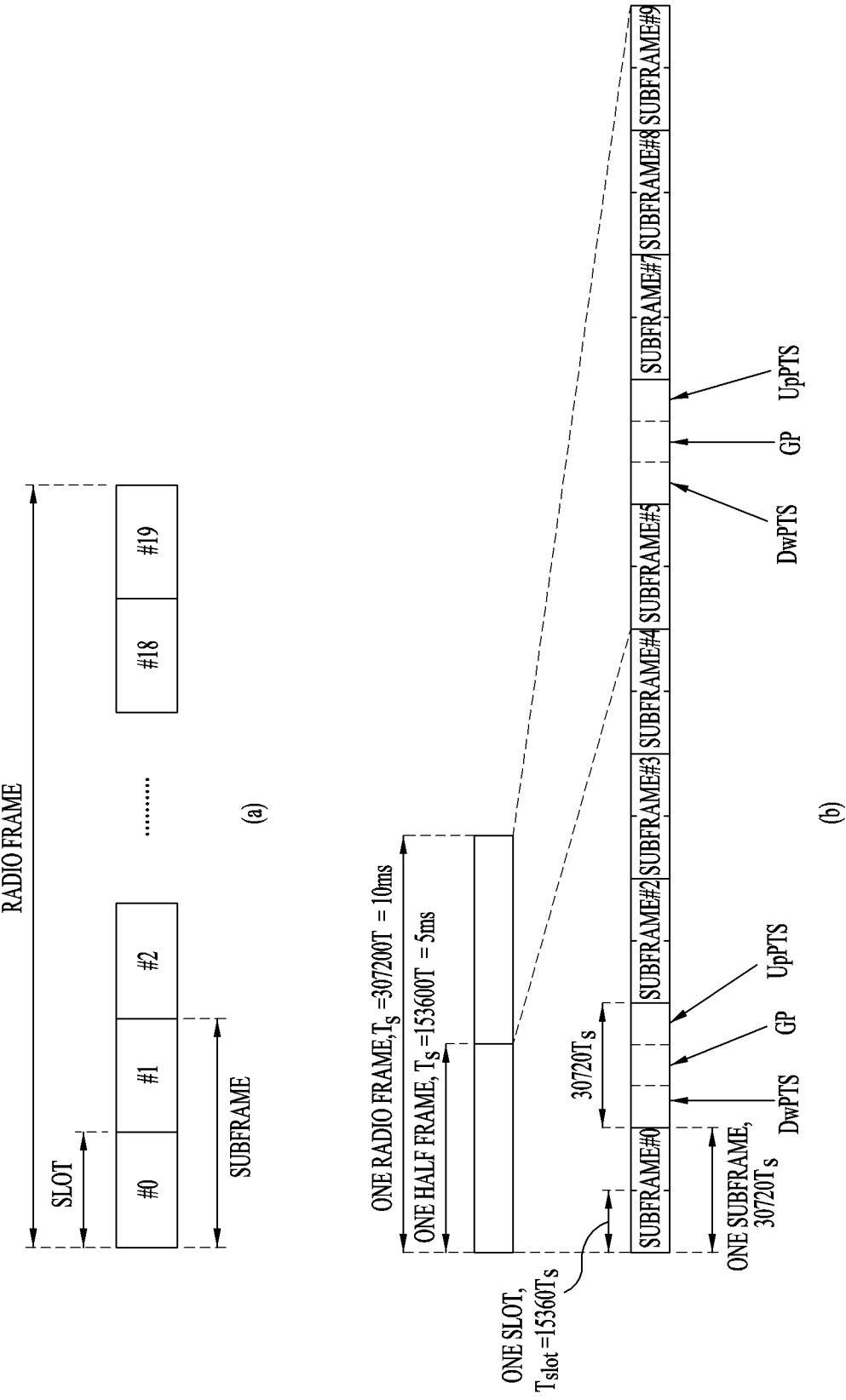
FIG. 1 is a diagram showing the structure of a radio frame.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
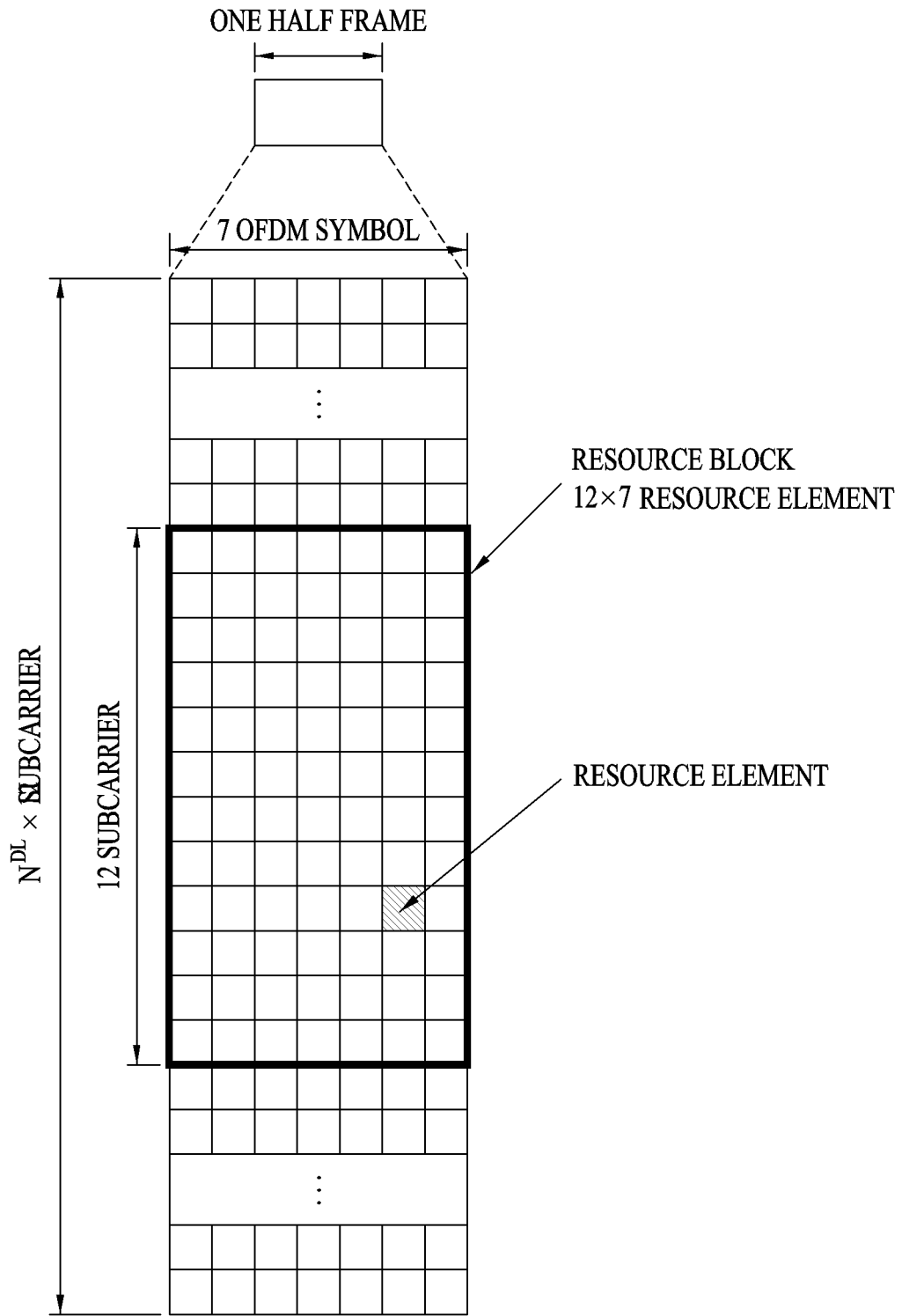
FIG. 2 is a diagram showing a resource grid in a downlink slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number $N^{DL}$ of RBs included in a downlink slot depends on a DL transmission bandwidth. A UL slot may have the same structure as a DL slot.

Figure 3:
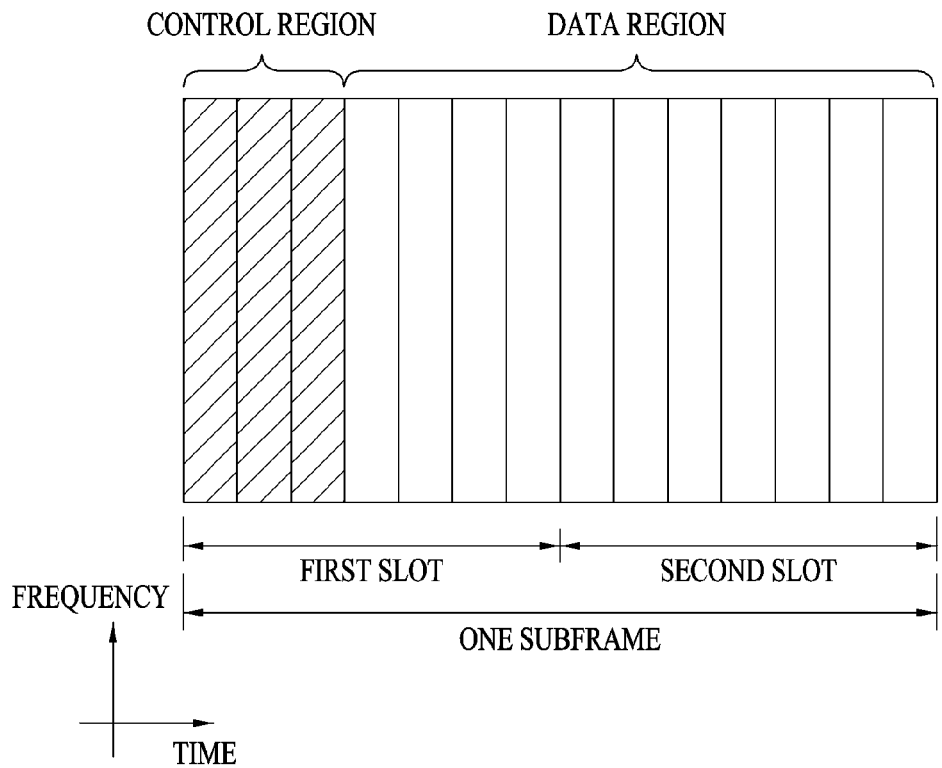
FIG. 3 is a diagram showing the structure of a downlink subframe.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
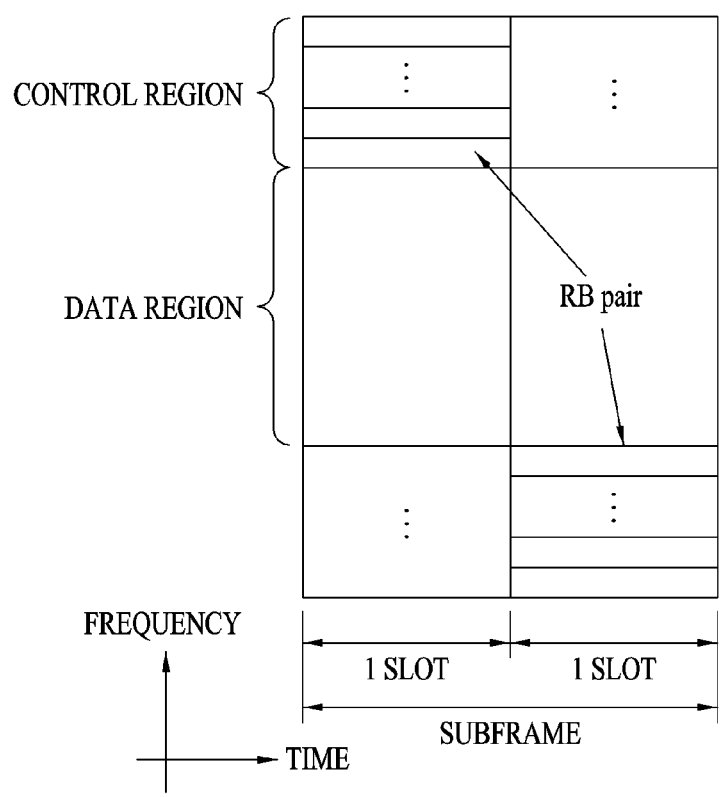
FIG. 4 is a diagram showing the structure of an uplink subframe.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

PUCCH

UL control information (UCI) transmitted over a PUCCH may include a scheduling request (SR), HARQ ACK/NACK information, and DL channel measurement information.

The HARQ ACK/NACK information may be generated depending on whether decoding of a DL data packet on a PDSCH is successful. In a conventional wireless communication system, 1 bit is transmitted as ACK/NACK information for DL single codeword transmission and 2 bits are transmitted as ACK/NACK information DL 2-codeword transmission.

The channel measurement information may refer to feedback information associated with a multiple input multiple output (MIMO) scheme and include a channel quality indicator (CQI), a precoding matrix index (PMI), and a rank indicator (RI). The channel measurement information may be collectively referred to as CQI. 20 bits may be used per subframe to transmit CQI.

The PUCCH may be demodulated using a binary phase shift keying (BPSK) scheme and a quadrature phase shift keying (QPSK) scheme. Control information of a plurality of UEs may be transmitted over the PUCCH. When code division multiplexing (CDM) is performed to distinguish between signals of UEs, constant amplitude zero autocorrelation (CAZAC) with a length of 12 is mainly used. The CAZAC sequence has characteristics of maintaining a constant amplitude in the time domain and frequency domain and thus is suitable for reduction in peak-to-average power ratio (PAPR) or cubic metric (CM) of a UE to increase coverage. In addition, ACK/NACK information in response to DL data transmitted over a PUCCH is covered using an orthogonal sequence or orthogonal cover (OC).

In addition, control information transmitted on a PUCCH may be distinguished using cyclically shifted sequences having different cyclic shift (CS) values. A cyclically shifted sequence may be generated by cyclically shifting a base sequence by a specific CS amount. The specific CS amount is indicated by a CS index. The number of available CSs may change depending on channel delay spread. Various types of sequences may be used as the base sequence and the aforementioned CAZAC sequence is an example of the base sequence.

In addition, the amount of control information that a UE can transmit in a subframe may be determined depending on the number of SC-FDMA symbols (i.e., SC-FDMA symbols except for an SC-FDMA symbol used to transmit a reference signal (RS) for coherent detection of PUCCH) that can be used to transmit the control information.

In 3GPP LTE, a PUCCH is defined in seven different formats according to transmitted control information, a modulation scheme and the amount of control information. Attributes of transmitted uplink control information (UCI) for each PUCCH format may be summarized as shown in Table 1.

TABLE 1

| PUCCH format | Modulation Scheme | Number of bits per subframe | Usage | Etc. |
| --- | --- | --- | --- | --- |
| 1 | N/A | N/A | SR (Scheduling Request) | |
| 1a | BPSK | 1 | ACK/NACK | One codeword |
| 1b | QPSK | 2 | ACK/NACK | Two codeword |
| 2 | QPSK | 20 | CQI | Joint Coding ACK/NACK (extended CP) |
| 2a | QPSK + BPSK | 21 | CQI + ACK/NACK | Normal CP only |
| 2b | QPSK + BPSK | 22 | CQI + ACK/NACK | Normal CP only |

PUCCH format 1 is used to transmit an SR only. When the SR is transmitted alone, an unmodulated waveform is applied, which will be described in detail below.

PUCCH format 1a or 1b is used for transmission of HARQ ACK/NACK. When only HARQ ACK/NACK is transmitted in a subframe, PUCCH format 1a or 1b may be used. Alternatively, HARQ ACK/NACK and SR may be transmitted in the same subframe using PUCCH format 1a or 1b.

PUCCH format 2 is used for transmission of CQI, whereas PUCCH format 2a or 2b is used for transmission of CQI and HARQ ACK/NACK. For the extended CP, PUCCH format 2 may be used for transmission of CQI and HARQ ACK/NACK.

Figure 5:
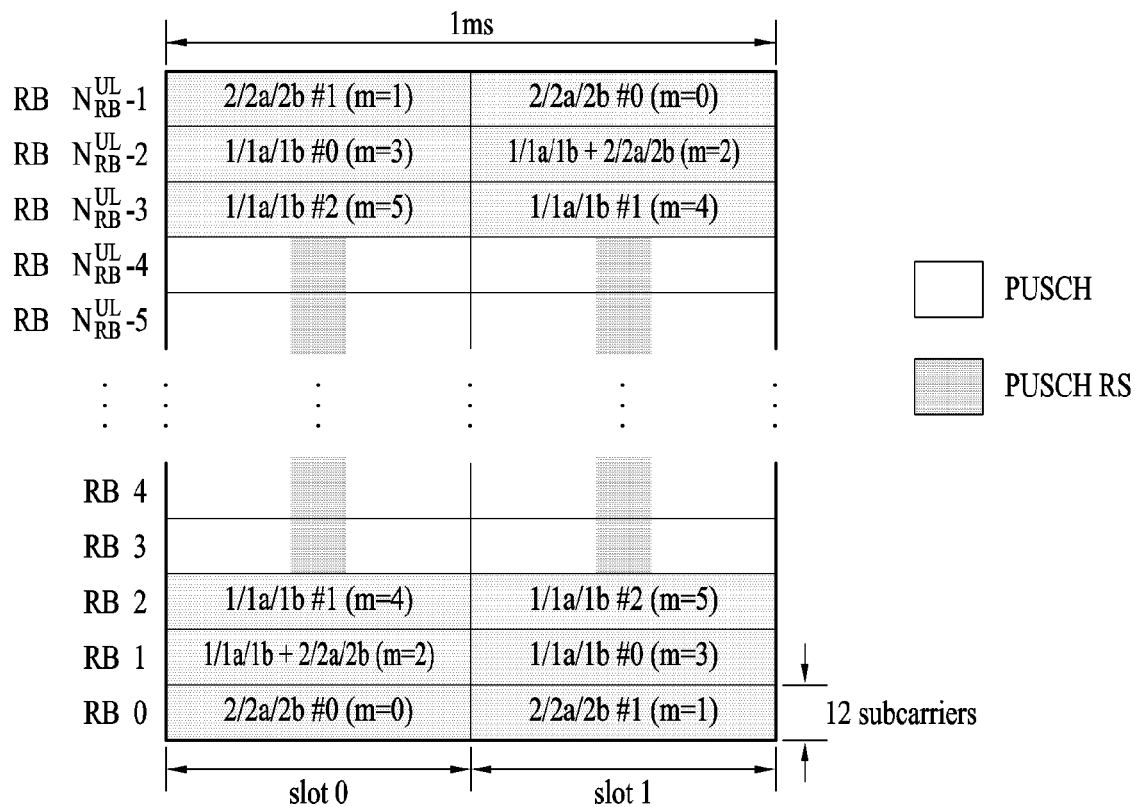
FIG. 5 is a diagram showing mapping of PUCCH formats in uplink physical resource blocks.

FIG. 5 illustrates mapping of PUCCH formats to PUCCH regions in UL physical resource blocks. In FIG. 5, $n_{PUCCH}^{(2)}$ denotes the number of resource blocks on UL, and 0, 1, . . . $n_{PUCCH}^{(2)}-1$ represent physical resource block numbers. Basically, a PUCCH is mapped to opposite edges of a UL frequency block. As illustrated in FIG. 5, PUCCH formats 2/2a/2b are mapped to PUCCH regions indicated by m=0 and 1, which may represent that PUCCH formats 2/2a/2b are mapped to resource blocks positioned at the band-edges. In addition, PUCCH formats 2/2a/2b and PUCCH formats 1/1a/1b may be mixed and mapped to a PUCCH region indicated by m=2. PUCCH formats 1/1a/1b may be mapped to PUCCH) regions indicated by m=3, 4, and 5. The number ($n_{PUCCH}^{(1)}$) of available PUCCH RBs may be indicated to UEs in a cell by the PUCCH format 2/2a/2b, through broadcast signaling.

PUCCH Resources

A BS allocates a PUCCH resource for UCI transmission to a UE in an implicit or explicit manner through higher layer signaling.

For ACK/NACK, a plurality of PUCCH resource candidates may be set for the UE by a higher layer. Of the PUCCH resource candidates, a PUCCH resource to be used by the UE may be determined in an implicit manner. For example, the UE may receive a PDSCH from the BS and transmit ACK/NACK for a corresponding data unit through a PUCCH resource implicitly determined by a PDCCH resource that carries scheduling information about the PDSCH.

Figure 6:
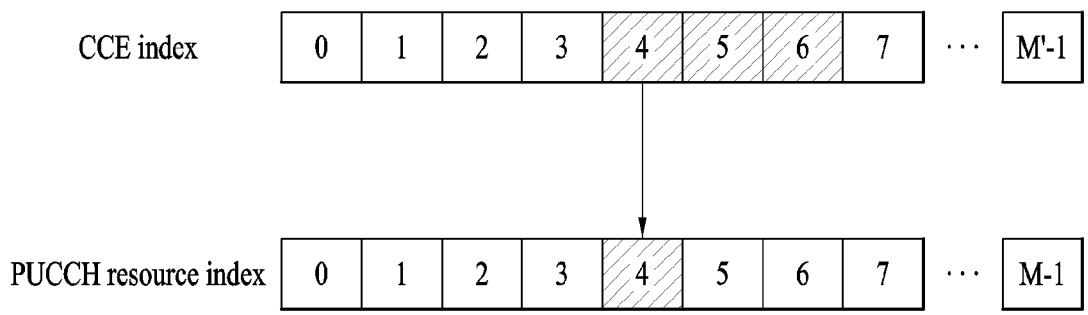
FIG. 6 is a diagram illustrating an example of determining PUCCH resources for ACK/NACK.

FIG. 6 illustrates an example of determining PUCCH resources for ACK/NACK.

In LTE, a PUCCH resource for ACK/NACK information is not pre-allocated to UEs. Rather, PUCCH resources are used separately by a plurality of UEs within a cell at each time. Specifically, a PUCCH resource that a UE uses to transmit ACK/NACK is implicitly determined based on a PDCCH carrying scheduling information about a PDSCH that delivers the DL data. An entire area in which a PDCCH is transmitted in a DL subframe includes a plurality of control channel elements (CCEs) and a PDCCH transmitted to a UE includes one or more CCEs. A CCE includes a plurality of (e.g., 9) resource element groups (REGs). One REG includes four resource elements (REs) that neighbors each other with an RS excluded. The UE transmits ACK/NACK through an implicit PUCCH resource that is derived or calculated according to a function of a specific CCE index (e.g., the first or lowest CCE index) from among the CCE indexes included in a PDCCH received by the UE.

Referring to FIG. 6, each PUCCH resource index corresponds to a PUCCH resource for ACK/NACK. As illustrated in FIG. 6, suppose that scheduling information about the PDSCH is transmitted to the UE on a PDCCH including CCEs #4, #5 and #6. The UE transmits ACK/NACK to a BS on a PUCCH, for example, PUCCH #4 that is derived or calculated from the lowest CCE index 4 constituting the PDCCH. FIG. 6 illustrates a case in which up to M' CCEs are present in the DL and up to M PUCCHs are present in UL. M may be equal to M', but it is also possible to set M to be different from M' and to map CCEs to PUCCHs in an overlapping manner.

For example, a PUCCH resource index may be determined by the following equation.

$$n_{PUCCH}^{(1)} = n_{CCE} + N_{PUCCH}^{(1)} \quad \text{Equation 1}$$

Herein, $n_{PUCCH}^{(1)}$ denotes the index of a PUCCH resource for transmission of ACK/NACK, and $N_{PUCCH}^{(1)}$ denotes a signaling value received from a higher layer. $n_{CCE}$ may denote the lowest index of the CCE indexes used for transmission of a PDCCH.

PUCCH Channel Structure

PUCCH formats 1a/1b will be described first below.

In PUCCH formats 1a/1b, a symbol modulated using BPSK or QPSK is multiplied by a CAZAC sequence having a length of 12. For example, multiplying a modulation symbol d(0) by a CAZAC sequence r(n) (n=0, 1, 2, ..., N−1) having a length of N gives a result of y(0), y(1), y(2), ..., y(N−1). Symbols y(0), y(1), y(2), ..., and y(N−1) may be called a block of symbols. After the modulation symbol is multiplied by the CAZAC sequence, block-wise-spreading using an orthogonal sequence is applied.

A Hadamard sequence with a length of 4 is employed for general ACK/NACK information, while a discrete Fourier transform (DFT) with a length of 3 is employed for shortened ACK/NACK information and a reference signal. For an extended CP, a Hadamard sequence with a length of 2 is employed for a reference signal.

Figure 7:
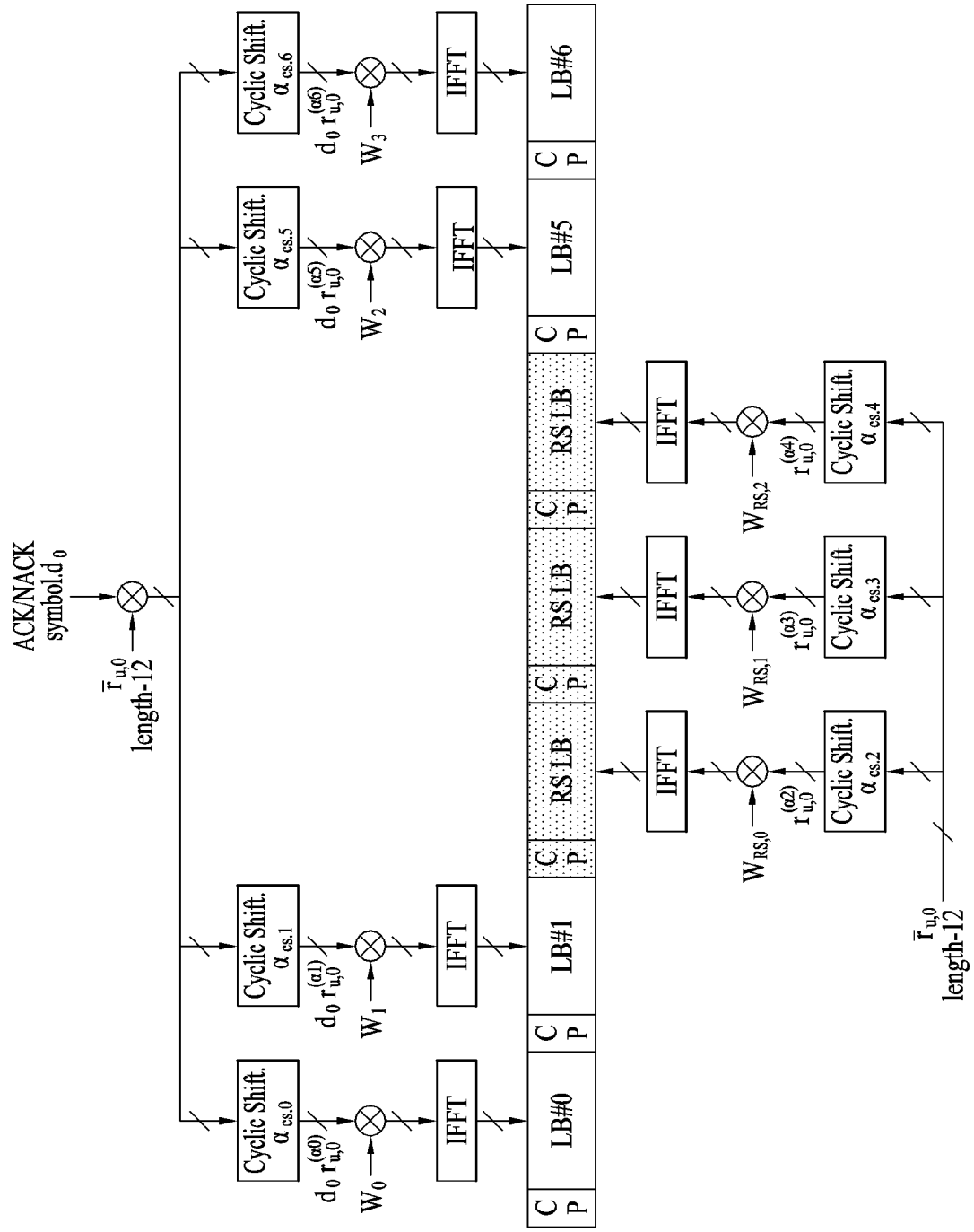
FIG. 7 is a diagram illustrating an ACK/NACK channel structure for a normal CP.

FIG. 7 illustrates an ACK/NACK channel structure for a normal CP. FIG. 7 exemplarily shows the structure of a PUCCH channel for transmission of HARQ ACK/NACK without CQI. Three consecutive SC-FDMA symbols in the middle of seven SC-FDMA symbols carry RSs and the remaining four SC-FDMA symbols carry ACK/NACK signals. For the extended CP, two consecutive symbols in the middle of SC-FDMA symbols may carry RSs. The number and positions of symbols used for an RS may change depending on a control channel, and the number and positions of symbols used for a ACK/NACK signal associated with the RS may change depending on the number and positions of symbols used for the RS.

1-bit ACK/NACK information and 2-bit ACK/NACK information (which is unscrambled) may be represented in a HARQ ACK/NACK modulation symbol using BPSK and QPSK, respectively. ACK may be encoded as 1, and NACK may be encoded as 0.

When a control signal is transmitted within an allocated band, 2-dimensional spreading is applied to enhance multiplexing capacity. That is, frequency domain spreading and time domain spreading are simultaneously applied to increase the number of UEs or control channels that can be multiplexed. To spread an ACK/NACK signal in the frequency domain, a frequency domain sequence is used as a basic sequence. A Zadoff-Chu (ZC) sequence, one of CAZAC sequences, may be used as the frequency domain sequence. For example, different cyclic shifts (CSs) may be applied to a ZC sequence, which is the basic sequence, to multiplex different UEs or different control channels. The number of CS resources supported by SC-FDMA symbols for PUCCH RBs for HARQ ACK/NACK transmission is set by a cell-specific higher-layer signaling parameter ($\Delta_{shift}^{PUCCH}$), and $\Delta_{shift}^{PUCCH} \in \{1, 2, 3\}$ represents 12, 6 or 4 shifts.

A frequency-domain-spread ACK/NACK signal is spread in the time domain using an orthogonal spreading code. As the orthogonal spreading code, a Walsh-Hadamard sequence or a DFT sequence may be used. For example, the ACK/NACK signal may be spread using orthogonal sequences (w0, w1, w2, w3) with a length of 4 for four symbols. In addition, the RS may also be spread using an orthogonal sequence with a length of 3 or 2, which is referred to as orthogonal covering (OC).

A plurality of UEs may be multiplexed in a code division multiplexing (CDM) scheme using CS resources in the frequency domain and OC resources in the time domain as described above. That is, ACK/NACK information and RSs of a large number of UEs may be multiplexed on the same PUCCH RB.

In time domain spreading CDM, the number of supported spreading codes for the ACK/NACK information is restricted by the number of RS symbols. That is, the number of SC-FDMA symbols for RS transmission is smaller than the number of SC-FDMA symbols for ACK/NACK transmission, and therefore multiplexing capacity of an RS is lower than multiplexing capacity of the ACK/NACK information. For example, in the case of a normal CP, the ACK/NACK information may be transmitted in four symbols, but three orthogonal spreading codes are used rather than four orthogonal spreading codes for the ACK/NACK information. This is because the number of RS transmission symbols is limited to three and thus only three orthogonal spreading codes can be used for the RS.

Examples of an orthogonal sequence used in spreading ACK/NACK information are shown in Tables 2 and 3. Table 2 shows a sequence for a symbol having a length of 4 and Table 3 shows a sequence for a symbol having a length of 3. The sequence for the symbol having a length of 4 is used in PUCCH formats 1/1a/1b of a normal subframe configuration. Considering a case in which an SRS is transmitted on the last symbol of the second slot in a subframe configuration, the sequence for the symbol with the length of 4 may be applied to the first slot and shortened PUCCH formats 1/1a/1b of the sequence for the symbol with the length of 3 may be applied to the second slot.

TABLE 2

| Sequence index $n_{oc}^{(p)}(n_s)$ | Orthogonal sequences $[w(0) \ldots w(N_{SF}^{PUCCH} - 1)]$ |
| --- | --- |
| 0 | [+1 +1 +1 +1] |
| 1 | [+1 −1 +1 −1] |
| 2 | [+1 −1 −1 +1] |

TABLE 3

| Sequence index $n_{oc}^{(p)}(n_s)$ | Orthogonal sequences $[w(0) \ldots w(N_{SF}^{PUCCH} - 1)]$ |
| --- | --- |
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

When three symbols are used for RS transmission and four symbols are used for ACK/NACK information transmission in a slot of a subframe of the normal CP, if, for example, six CSs in the frequency domain and three OC resources in the time domain are allowed to be used, HARQ ACK/NACK signals from 18 different UEs may be multiplexed in a PUCCH RB. When two symbols are used for RS transmission and four symbols are used for ACK/NACK information transmission in a slot of a subframe of the extended CP, if, for example, six CSs in the frequency domain and two OC resources in the time domain are allowed to be used, HARQ ACK/NACK signals from 12 different UEs may be multiplexed in a PUCCH RB.

Hereinafter, PUCCH format 1 will be described. A scheduling request (SR) is transmitted by requesting scheduling of the UE or not requesting scheduling of the UE. An SR channel reuses an ACK/NACK channel structure in PUCCH formats 1a/1b and is configured in an on-off keying (OOK) manner based on the design of the ACK/NACK channel. An RS is not transmitted on an SR channel. Thus, a sequence with a length of 7 is used in the case of the normal CP, and a sequence with a length of 6 is used in the case of the extended CP. Different CSs or orthogonal covers may be allocated to an SR and ACK/NACK. That is, in implementing transmission of a positive SR, the UE transmits HARQ ACK/NACK through resources allocated for the SR. In implementing transmission of a negative SR, the UE transmits HARQ ACK/NACK through resources allocated for ACK/NACK.

Hereinafter, PUCCH formats 2/2a/2b will be described. PUCCH formats 2/2a/2b are control channels for transmission of channel measurement feedback (CQI, PMI and RI).

A report period of the channel measurement feedback (hereinafter, referred to as CQI information) and a frequency unit (or frequency resolution) subject to measurement may be controlled by a BS. Periodic and aperiodic CQI reports may be supported in the time domain. PUCCH format 2 may be used only for the periodic report and a PUSCH may be used for the aperiodic report. In the case of the aperiodic report, the BS may instruct the UE to transmit an individual CQI report on a resource scheduled for UL data transmission.

Figure 8:
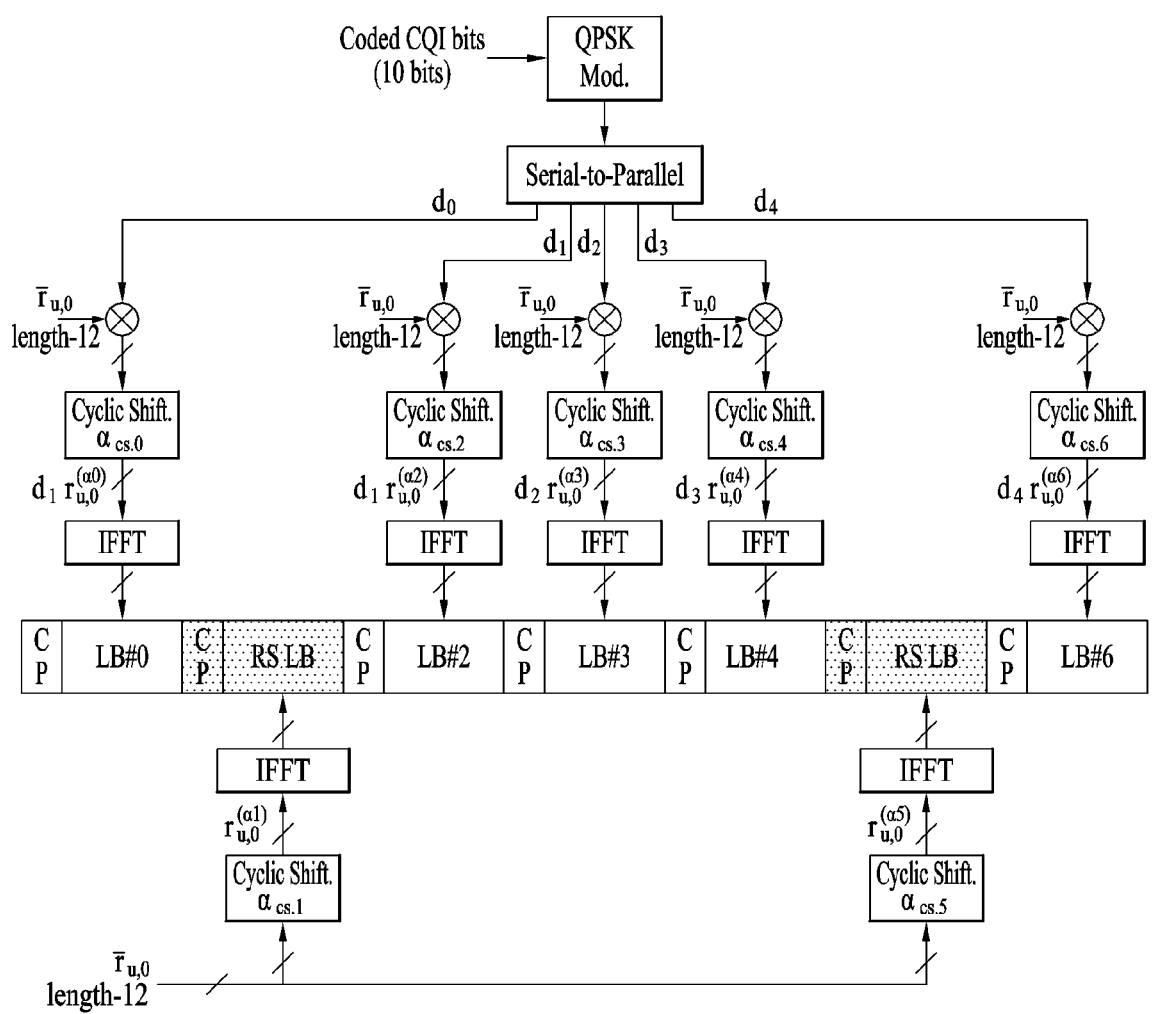
FIG. 8 is a diagram illustrating a CQI channel structure for a normal CP.

FIG. 8 illustrates a CQI channel structure for a normal CP. SC-FDMA symbols #1 and #5 (second and sixth symbols) from among SC-FDMA symbols #0 to #6 of a slot may be used to transmit a demodulation reference signal (DMRS), and CQI information may be transmitted in the remaining SC-FDMA symbols. In the case of an extended CP, one SC-FDMA symbol (SC-FDMA symbol #3) is used to transmit the DMRS.

In PUCCH formats 2/2a/2b, modulation by a CAZAC sequence is supported, and a symbol modulated according to QPSK is multiplied by a CAZAC sequence with a length of 12. The CS of the sequence is changed between symbols and between slots. OC is used for the DMRS.

Of the seven SC-FDMA symbols included in a slot, two SC-FDMA symbols spaced apart by an interval of three SC-FDMA symbols carry DMRSs and the remaining five SC-FDMA symbols carry CQI information. Two RSs are used in a slot in order to support a high-speed UE. A UE is identified using a CS sequence. CQI information symbols are modulated into SC-FDMA symbols and transmitted. An SC-FDMA symbol includes a sequence. That is, a UE modulates CQI into each sequence and transmits the sequences.

The number of symbols that can be transmitted in a TTI is 10 and QPSK is determined for modulation of CQI information. When QPSK mapping is employed for the SC-FDMA symbols, an SC-FDMA symbol may carry a 2-bit CQI value and thus a slot may carry a 10-bit CQI value. Accordingly, a maximum of a 20-bit CQI value may be carried in a subframe. To spread the CQI information in the frequency domain, a frequency domain spreading code is used.

A CAZAC sequence with a length of 12 (e.g., a ZC sequence) may be used for the frequency domain spreading code. Control channels may be distinguished from each other using CAZAC sequences having different CS values. The frequency-domain-spread CQI information is subjected to IFFT.

12 different UEs may be orthogonally multiplexed in the same PUCCH RB using 12 equally spaced CSs. For the normal CP, a DMRS sequence on SC-FDMA symbols #1 and #5 (SC-FDMA symbols #3 for the extended CP) is similar to a CQI signal sequence in the frequency domain, but the DMRS sequence is not modulated as in the case of the CQI information. A UE may be semi-statically set by higher layer signaling so as to periodically report different CQI, PMI and RI types on a PUCCH resource indicated by a PUCCH resource index $n_{PUCCH}^{(2)}$. Herein, the PUCCH resource index $n_{PUCCH}^{(2)}$ is information indicating a PUCCH region and a CS value used for PUCCH format 2/2a/2b transmission.

Hereinafter, an enhanced-PUCCH (e-PUCCH) format will be described. The e-PUCCH format may correspond to PUCCH format 3 in LTE-A. Block spreading may be applied to ACK/NACK transmission using PUCCH format 3.

Block spreading is a method of modulating a control signal using SC-FDMA, which is distinguished from the PUCCH format 1 or 2 series. As shown in FIG. 9, a symbol sequence may be spread in the time domain using an orthogonal cover code (OCC) and transmitted. Control signals of a plurality of UEs may be multiplexed in the same RB using the OCC. In the case of PUCCH format 2 described above, a symbol sequence is transmitted in the time domain and control signals of multiple UEs are multiplexed using a CS of a CAZAC sequence. On the other hand, in the case of a block spreading-based PUCCH format (e.g., PUCCH format 3), a symbol sequence is transmitted in the frequency domain and control signals of multiple UEs are multiplexed through the time domain spreading based on an OCC.

FIG. 9(a) illustrates an example of generation and transmission of four SC-FDMA symbols (i.e., data portions) using an OCC with a length of 4 (or spreading factor (SF)=4) in a symbol sequence during one slot. In this case, three RS symbols (i.e., RS portions) may be used in one slot.

FIG. 9(b) illustrates an example of generation and transmission of five SC-FDMA symbols (i.e., data portions) using an OCC with a length of 5 (or SF=5) in a symbol sequence during one slot. In this case, two RS symbols may be used in one slot.

In the examples of FIG. 9, the RS symbols may be generated from a CAZAC sequence to which a specific CS value is applied, and a predetermined OCC may be applied to (or multiplied by) a plurality of RS symbols and transmitted. If 12 modulation symbols are used per OFDM symbol (or SC-FDMA symbol) and each modulation symbol is generated according to QPSK in the examples of FIG. 9, the maximum number of bits that can be transmitted in a slot is 12×2=24. Thus, the total number of bits that can be transmitted in two slots is 48. When the PUCCH channel structure employing the block spreading scheme is used, it may be possible to transmit extended control information compared to the case of existing PUCCH formats 1 and 2.

ACK/NACK Multiplexing Scheme

In ACK/NACK multiplexing, content of an ACK/NACK to a plurality of data units may be identified by a combination of an ACK/NACK unit actually used for ACK/NACK transmission and one of QPSK-modulated symbols. For example, suppose that an ACK/NACK unit carries 2-bit information and receives a maximum of two data units. Herein, it is assumed that a HARQ ACK/NACK for each of the received data units is represented by an ACK/NACK bit. In this case, a transmitter that has transmitted data may identify the ACK/NACK results as shown below in Table 4.

TABLE 4

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

In Table 4, HARQ-ACK(i) (i=0, 1) represents an ACK/NACK result with respect to data unit i. Since a maximum of two data units (data unit 0 and data unit 1) is assumed to be received as described above, an ACK/NACK result with respect to data unit 0 is represented as HARQ-ACK(0) and an ACK/NACK result with respect to data unit 1 is represented as HARQ-ACK(1) in Table 4. Referring to Table 4, DTX (Discontinuous Transmission) indicates that the data unit corresponding to HARQ-ACK(i) is not transmitted or that a receiver cannot detect presence of the data unit corresponding to HARQ-ACK(i). In addition, $n_{PUCCH,X}^{(1)}$ denotes an ACK/NACK unit actually used for ACK/NACK transmission. When there is a maximum of two ACK/NACK units, the ACK/NACK units may be represented as $n_{PUCCH,0}^{(1)}$ and $n_{PUCCH,1}^{(1)}$. In addition, b(0), b(1) denote two bits transmitted by selected ACK/NACK units. Modulation symbols transmitted through ACK/NACK units are determined depending on bits of b(0) and b(1).

For example, when the receiver successfully receives and decodes two data units (as indicated by ACK, ACK in Table 4), the receiver transmits two bits (1, 1) using the ACK/NACK unit $n_{PUCCH,1}^{(1)}$. If the receiver fails to decode (or detect) the first data unit (i.e., data unit 0 corresponding to HARQ-ACK(0)) of the two received data units and successfully decodes the second data unit (i.e. data unit 1 corresponding to HARQ-ACK(1)) (as indicated by NACK/DTX, ACK in Table 4), the receiver transmits two bits (0, 0) using the ACK/NACK unit $n_{PUCCH,1}^{(1)}$.

As such, it is possible to transmit ACK/NACK information about a plurality of data units using one ACK/NACK unit by linking or mapping a combination of a selected ACK/NACK unit and actual bits of the transmitted ACK/NACK unit (i.e., a combination of selected $n_{PUCCH,0}^{(1)}$ or $n_{PUCCH,1}^{(1)}$ and b(0), b(1) in Table 4) to the content of actual ACK/NACK. ACK/NACK multiplexing for more than two data units may be readily implemented by extending the principle of the above-described ACK/NACK multiplexing.

In the ACK/NACK multiplexing scheme described above, NACK and DTX may not be discriminated from each other when at least one ACK is present for each data unit (that is, NACK and DTX may be coupled as NACK/DTX as shown in Table 4). This is because all ACK/NACK states (i.e., ACK/NACK hypotheses) that may be generated when NACK and DTX are discriminated from each other cannot be represented by only combinations of ACK/NACK units and QPSK-modulated symbols. When ACK is not present for any data unit (i.e., when only NACK or DTX is present for all data units), a single definite case of NACK indicating that only one of HARQ-ACKs(i) is a definite NACK (i.e., NACK discriminated from DTX) may be defined. In this case, an ACK/NACK unit corresponding to a data unit for a definite NACK may be reserved for transmission of a plurality of ACK/NACK signals.

PUCCH Piggyback

In UL transmission in a legacy 3GPP LTE system (e.g., a Release-8 system), single carrier transmission with good cubic metric (CM) property or a good peak-to-average power ratio (PAPR), which affects performance of a power amplifier, is maintained to effectively utilize the power amplifier of the UE. That is, single carrier characteristics of data to be transmitted may be maintained through DFT-precoding in the case of PUSCH transmission in the legacy LTE system. In the case of PUCCH transmission, single carrier characteristics may be maintained by carrying information on a sequence having single carrier characteristics. However, if DFT-precoded data is non-continuously assigned on a frequency axis, or if PUSCH and PUCCH are simultaneously transmitted, such single carrier characteristics are not maintained.

Figure 10:
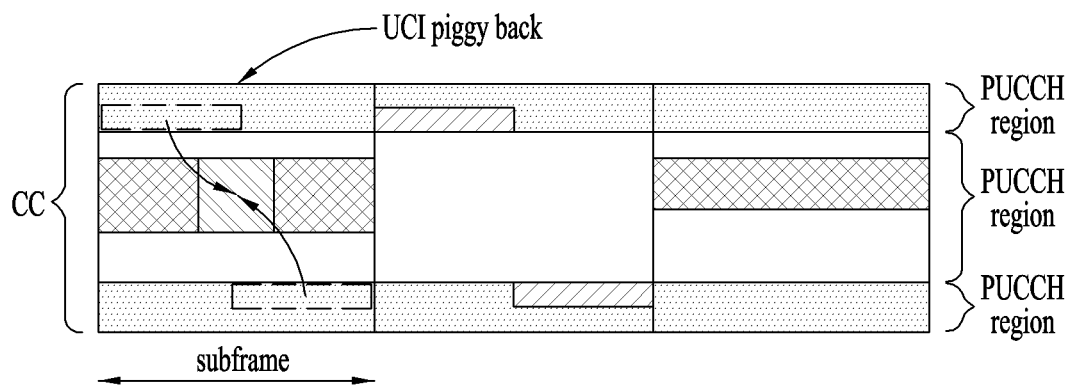
FIG. 10 is a diagram illustrating a method for transmitting uplink control information via a PUSCH.

Thus, when PUSCH transmission takes place in the same subframe as that for PUCCH transmission as illustrated in FIG. 10, uplink control information (UCI) to be transmitted on a PUCCH may be piggybacked together with data over a PUSCH in order to maintain the single carrier characteristics.

As described above, the legacy LTE UE cannot simultaneously transmit the PUCCH and the PUSCH, and thus the UE multiplexes UCI (CQI/PMI, HARQ-ACK, RI, etc.) in a PUSCH region in a subframe in which the PUSCH is transmitted. For example, when CQI and/or PMI is transmitted in a subframe assigned for PUSCH transmission, UL-SCH data and CQI/PMI may be multiplexed prior to DFT-spreading, such that control information and data are simultaneously transmitted. In this case, rate matching is performed for the UL-SCH data in consideration of CQI/PMI resources. In addition, control information such as HARQ ACK and RI may be multiplexed in the PUSCH region by puncturing the UL-SCH data.

Reference Signal (RS)

In transmitting packets in a wireless communication system, the packets are transmitted over a radio channel, and therefore signal distortion may occur in the transmission process. For a receiver to receive the correct signal in spite of signal distortion, the received distorted signal should be corrected using channel information. In detecting the channel information, a signal which is known to both the transmitter and the receiver is transmitted and the degree of distortion of the signal received over the channel is used to detect the channel information. This signal is referred to as a pilot signal or a reference signal.

In the case in which data is transmitted and received using multiple antennas, a channel state between a transmit antenna and a receive antenna needs to be identified to receive a correct signal. Accordingly, a separate RS is needed for each transmit antenna and, more particularly, for each antenna port.

RSs may be divided into an UL RS and a DL RS. In a current LTE system, the UL RS includes:

i) a demodulation-reference signal (DM-RS) for channel estimation for coherent demodulation of information transmitted over a PUSCH and a PUCCH, and ii) a sounding reference signal (SRS) for measuring UL channel quality at frequencies of different networks in the BS.

The DL RS includes:

i) a cell-specific reference signal (CRS) shared by all UEs in a cell;

ii) a UE-specific reference signal for a specific UE;

iii) a demodulation-reference signal (DM-RS) transmitted for coherent demodulation in the case of transmission of a PDSCH;

iv) a channel state information-reference signal (CSI-RS) for delivering channel state information (CSI) in the case of transmission of a DL DMRS;

v) a multimedia broadcast single frequency network (MBSFN) reference signal transmitted for coherent demodulation of a signal transmitted in an MBSFN mode, and vi) a positioning reference signal used to estimate geographical position information of a UE.

The RSs may be broadly divided into two reference signals according to the purposes thereof. There are an RS used to acquire channel information and an RS used for data demodulation. Since the former is used when the UE acquires channel information on DL, this RS should be transmitted over a wide band and even a UE which does not receive DL data in a specific subframe should receive the RS. This RS is also applied to situations such as handover. The latter RS is sent by the BS along with a resource on DL. The UE may receive the RS to perform channel measurement to implement data modulation. This RS should be transmitted in a region in which data is transmitted.

The CRS is used for acquisition of channel information and for data demodulation, and the UE-specific RS is used only for data demodulation. The CRS is transmitted in every subframe in a wide band and RSs for up to four antenna ports are transmitted according to the number of transmit antennas of the BS.

For example, if the number of transmit antennas of the BS is 2, CRSs for antenna ports #0 and #1 are transmitted. If the number of transmit antennas of the BS is 4, CRSs for antenna ports #0 to #3 are respectively transmitted.

Figure 11:
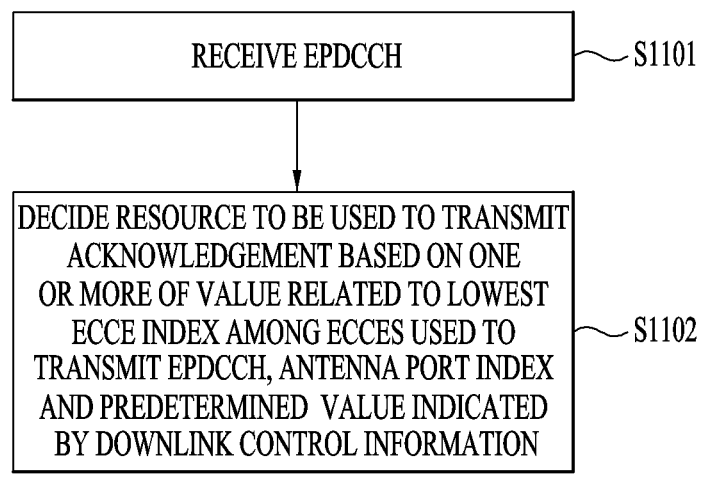
FIG. 11 is a flowchart illustrating an embodiment of the present invention.

FIG. 11 is a diagram illustrating a pattern in which CRSs and DRSs defined in a legacy 3GPP LTE system (e.g., Release-8) are mapped onto resource block (RB) pairs. A downlink RB pair, as a unit to which an RS is mapped, may be represented as a unit of one subframe in the time domain times 12 subcarriers in the frequency domain. That is, one RB pair has a length of 14 OFDM symbols for a normal CP (FIG. 11($a$)) and a length of 12 OFDM symbols for an extended CP (FIG. 11($b$)).

FIG. 11 shows locations of RSs on RB pairs in a system in which the BS supports four transmit antennas. In FIG. 11, resource elements (REs) denoted by "0", "1", "2" and "3" represent the locations of the CRSs for antenna port indexes 0, 1, 2 and 3, respectively. In FIG. 11, REs denoted by "D" represent locations of the DMRSs.

Enhanced-PDCCH (EPDCCH)

In an LTE system after Release 11, an enhanced-PDCCH (EPDCCH) which can be transmitted through the existing PDSCH region is considered as a solution to lack of capacity of a PDCCH due to coordinated multi-point (CoMP), multi user-multiple input multiple output (MU-MIMO), and the like and degradation of PDCCH performance due to inter-cell interference. In addition, with the EPDCCH, channel estimation may be performed based on DMRSs contrary to the existing CRS-based PDCCH in order to obtain a precoding gain.

EPDCCH transmission may be divided into localized EPDCCH transmission and distributed EPDCCH transmission according to configuration of a physical resource block (PRB) used for EPDCCH transmission. The localized EPDCCH transmission represents the case in which enhanced control channel elements (ECCEs) used in transmitting one DCI neighbor each other in the frequency domain, and may employ specific pre-coding to obtain a beamforming gain. For example, localized EPDCCH transmission may be based on consecutive ECCEs the number of which corresponds to an aggregation level. On the other hand, the distributed EPDCCH transmission represents the case in which an EPDCCH is transmitted on separated PRB pairs in the frequency domain. Distributed EPDCCH transmission has a benefit in terms of frequency diversity. For example, distributed EPDCCH transmission may be based on ECCEs including four EREGs contained in each PRB pair separated in the frequency domain. For the UE, one or two EPDCCH PRB sets may be configured by higher layer signaling, and each EPDCCH PRB set may be intended for one of localized EDPCCH transmission and distributed EPDCCH transmission.

The UE may perform blind decoding as in a legacy LTE/LTE-A system to receive/acquire DCI over an EPDCCH. More specifically, the UE may attempt to decode (or monitor) a set of EPDCCH candidates at each aggregation level, for DCI formats corresponding to set transmission modes. Herein, the set of EPDCCH candidates subjected to monitoring may be referred to as a specific search space for the EPDCCH UE, and the search space may be set/configured for each aggregation level. In addition, the aggregation levels may be {1, 2, 4, 8, 16, 32} according to a type of a subframe, the length of a CP, and the amount of available resources in a PRB pair, which is more or less different from the case of a legacy LTE/LTE-A system.

For a UE having an EPDCCH configured, REs included in a PRB pair set are indexed by EREGs, and the EREGs are in turn indexed by ECCEs. EPDCCH candidates configuring the search space may be determined based on the indexed ECCEs and then blind decoding may be performed. Thereby, control information may be received. Herein, EREG corresponds to REG in the legacy LTE/LTE-A and ECCE corresponds to CCE in the legacy LTE/LTE-A. A PRB pair may include 16 EREGs.

The UE, which has received the EPDCCH, may transmit acknowledgement (ACK/NACK) for the EPDCCH on a PUCCH. An index of a resource used at this time, that is, a PUCCH resource, may be determined by a lowest ECCE index among ECCEs used to transmit the EPDCCH similarly to Equation 1 above. That is, the resource may be expressed by Equation 2 below.

$$n_{PUCCH\text{-}ECCE}^{(1)} = n_{ECCE} + N_{PUCCH}^{(1)} \quad \text{Equation 2}$$

In Equation 2 above, $n_{PUCCH\text{-}ECCE}^{(1)}$ denotes the PUCCH resource index, $n_{ECCE}$ denotes the lowest ECCE index among the ECCEs used to transmit the EPDCCH, $N_{PUCCH}^{(1)}$ (also referred to as $N_{PUCCH,EPDCCH}^{(1)}$) denotes a value delivered via higher layer signaling and means a start point of a PUCCH resource index.

However, if the PUCCH resource index is uniformly determined by Equation 2 above, resource collision may occur. For example, when two EPDCCH PRB sets are configured, since ECCE indexing in each EPDCCH PRB set is independent, the lowest ECCE indices of EPDCCH PRB sets may be the same. In this case, this problem may be solved by making start points of PUCCH resources different on the basis of a user. However, when the start points of PUCCH resources are made different on the basis of a user, many PUCCH resources are inefficiently reserved. In addition, since DCIs of several users may be transmitted at the same ECCE positions on the EPDCCH similarly to MU-MIMO, there is a need for a PUCCH resource allocation method considering this. Hereinafter, in the description of the present invention, a PUCCH resource decision method for solving the above-described problem will be described in detail.

Decision of PUCCH Resource

In order to prevent PUCCH resource collision, a dynamic offset may be used. That is, a predetermined value (offset value) indicated by a DCI is applied to PUCCH resources which may collide with each other, thereby avoiding collision. This may be expressed by Equation 3 below.

$$n_{PUCCH,n}^{(1)} = N_{PUCCH,n}^{(1)} + f_1(n_{ECCE}) + \delta_{AP} \times k_P + \delta_{ARI} \times n_{ARI} \quad \text{Equation 3}$$

In Equation 3, $N_{PUCCH,n}^{(1)}$ denotes the start point of the resource index which will be used to transmit the PUCCH for the EPDCCH, $n_{ECCE}$ denotes the lowest ECCE index, $f_1(n_{ECCE})$ denotes a value related to the lowest ECCE index, and $k_P$ denotes an antenna port index and may be $k_p = n_p - 107$ ($n_p$ being an AP number), for example, when the antenna port is {107, 108, 109, 110}. $\delta_{AP}$ denotes a value (0 or 1) for determining whether the antenna port index is used, $n_{ARI}$ denotes a value indicated by downlink control information, and $\delta_{ARI}$ denotes a value (0 or 1) for determining whether the value indicated by the downlink control information is used. In addition, $\delta_{ARI}$ may be a constant for changing scaling of an ARI value at a specific aggregation level. (For example, when an aggregation level is 16 and $n_{ARI} \in \{0, a_1, a_2, a_3\} = \{0, -1, -2, -3\}$, $\delta$ may be set to 2 or 3 to move the PUCCH resource to a wider range, thereby making better use of the PUCCH resource.)

That is, the UE, which has received the EPDCCH in step S1101 of FIG. 11, may determine a PUCCH resource to be used to transmit acknowledgement based on one or more of a value related to a lowest ECCE index among ECCEs used to transmit EPDCCH, an antenna port index, and a predetermined (offset) value indicated by downlink control information in step S1102. Here, whether the predetermined value indicated by downlink control information is used may be determined according to a type of the transmitted EPDCCH, the size of a DCI format, information related to an EPDCCH PRB set, on which the EPDCCH is transmitted, the type of a signal transmitted on a PDSCH indicated by the EPDCCH, etc. That is, according to an EPDCCH transmission type, a duplex mode, a U/D configuration in the case of TDD, a DCI format, a data type of a PDSCH, etc., $f_1(n_{ECCE})$, $\delta_{AP}$, $k_p$, $\delta_{ARI}$, and an ARI variable {0, $a_1$, $a_2$, $a_3$} values mapped to values of a specific field included in downlink control information) may be variably set. At this time, some or all of the above-described variables may be predetermined according to an EPDCCH transmission type, a duplex mode, a U/D configuration in the case of TDD, a DCI format, a data type of a PDSCH, etc. or may be signaled from the eNB to the UE via a higher lay signal (e.g., an RRC signal or a MAC signal).

Determining whether $n_{ARI}$ is used

First, if an EPDCCH PRB set, on which an EPDCCH is transmitted, is of a distributed type, $n_{ARI}$ may be used when deciding a resource to be used to transmit acknowledgement. In other words, whether the ARI is used is determined according to the EPDCCH transmission type. More specifically, in localized transmission, $n_{ARI}$ is not used (that is, $\delta_{ARI} = 0$) and the PUCCH resource may be decided by one or more of $f_1(n_{ECCE})$ or $k_p$ only. This may be efficient when low aggregation levels (ALs) are concentrated in a localized EPDCCH and high ALs are concentrated in a distributed EPDCCH. This may be expressed by Equation 4 below.

$$n_{PUCCH}^{(1)} = N_{PUCCH,n}^{(1)} + f_1(n_{ECCE}) + \delta_{AP} \times k_P, \text{ for localized type}$$

$$n_{PUCCH}^{(1)} = N_{PUCCH,n}^{(1)} + f_1(n_{ECCE}) + \delta_{ARI} \times n_{ARI}, \text{ for distributed type} \quad \text{Equation 4}$$

That is, in a localized EPDCCH set in which low ALs are concentrated, it is possible to prevent PUCCH resource collision using a lowest ECCE index and/or AP index. For localized type, when both an ARI and an AP offset are used, the offset positions of UEs may be significantly changed such that it is difficult to efficiently use the PUCCH resource. In addition, when the high ALs are concentrated in the distributed EPDCCH set, the PUCCH resource position may be determined using $n_{ARI}$ only. At this time, since many high ALs are used, the values of the ARI set may be mainly set to negative values (e.g., {0, −1, −2, −3} or {0, 1, −1, −2}), thereby making better use of the PUCCH resource.

Second, if the size of the DCI format is greater than a predetermined value, $n_{ARI}$ may be used when deciding a resource used to transmit acknowledgement. In other words, $n_{ARI}$ may or may not be used according to the DCI format. In the case of a specific DCI format, e.g., DCI format 1A, since the number of bits used to deliver control information is small, if a 2-bit ARI is added, a coding rate may be lowered. In addition, even in a common search space, use of $n_{ARI}$ may be restricted. That is, in the specific DCI format (DCI format 1A), use of $n_{ARI}$ may be restricted. If $n_{ARI}$ is not used, $k_p$ may be used.

Third, whether $n_{ARI}$ is used may be determined according to information related to an EPDCCH physical resource block (PRB) set, on which an EPDCCH is transmitted (e.g., an aggregation level or the number of PRB pairs). In particular, when the aggregation level or the number of PRB pairs is large, $n_{ARI}$ may be used. If the number of PRB pairs is large, many PUCCH resources are reserved. Therefore, PUCCH resources may be wasted. If $n_{ARI}$ is used (in particular, if negative values are mainly used as ARI values), PUCCH resources may be efficiently used. In addition, if an aggregation level is large, $\delta_{ARI}$ may be a value of 2 or more.

Fourth, when the type of a signal transmitted on the PDSCH indicated by the EPDCCH is any one of system information, a paging signal or a random access response, the predetermined value indicated by the downlink control information may not be used when deciding the resource used to transmit acknowledgement (ACK/NACK). That is, $n_{ARI}$ may not be used when signals which do not require acknowledgement (ACK/NACK) transmission are transmitted on the PDSCH. In this case, since the length of the DCI is changed according to the type of information about the PDSCH to increase a blind decoding count, it is possible to prevent the blind decoding count from increasing by fixing a corresponding ARI area to a specific state to fix the length of the DCI. As an embodiment, when A/N is not transmitted, the ARI may be fixed to 00 (at this time, $n_{ARI}=0$) in the case where the number of ARI bits is 2.

Decision of ARI Aggregation

Aggregation $\{0, a_1, a_2, a_3\}$ of values which may be used as ARI variables (values mapped to values of the specific field included in the downlink control information) may be changed according to an antenna port index, an aggregation level or whether $n_{ARI}$ is used.

As $n_{ARI}$, the values mapped to the values of the specific field if $k_p$ or an aggregation level is large or if the antenna port index is large may include negative values greater in number than the number of negative values included in the values mapped to the values of the specific field if $k_p$ or the aggregation level is small or if the antenna port index is small. For example, $\{0, a_1, a_2, a_3\} = \{0, a_1, a_2, a_3\} = \{0, -1, -2, -3\}$ or $\{0, -1, -2, 1\}$ if $k_p$ or an aggregation level is large and $\{0, a_1, a_2, a_3\} = \{0, -1, 1, 2\}$ or $\{0, 1, 2, 3\}$ if $k_p$ or an aggregation level is small. If the aggregation level is large or if $k_p$ is large, a distance between PUCCH resource positions of the UEs increases. By indicating a closer PUCCH resource using ARI values mainly having a negative value (e.g., $\{0, 1, -1, -2\}$ or $\{0, -1, -2, -3\}$), it is possible to more efficiently use resources.

Meanwhile, as a method applicable independent of or along with the above descriptions, the value $f_1(n_{ECCE})$ related to the lowest ECCE index may be a quotient of the lowest ECCE index divided by an aggregation level. That is, $$f_1(n_{ECCE}) = \left\lfloor \frac{n_{ECCE}}{AL} \right\rfloor.$$

At this time, the ARI variable may be set regardless of the aggregation level (e.g., $\{0, -1, 1, 2\}$). In this case, $\delta_{ARI}$ is 1. In addition, an AP index may always be used (only in the localized EPDCCH, $\delta_{AP}=1$). In this method, since the PUCCH resource may be indicated with a size of 1 regardless of aggregation level, it is possible to prevent PUCCH resource waste.)

If $n_{ARI}$ is not used, the value $f_1(n_{ECCE})$ related to the lowest ECCE index may be a product of a quotient of the lowest ECCE index divided by an aggregation level and the number of ECCEs per PRB pair. That is, $$f_1(n_{ECCE}) = d \left\lfloor \frac{n_{ECCE}}{d} \right\rfloor,$$

wherein d is the number of ECCEs per PRB pair. When $k_p$ is applied in addition to $n_{ECCE}$, PUCCH resource collision may occur between a UE using $n_{ECCE}=2$ and $k_p=2$ and a UE using $n_{ECCE}=4$ and $k_p=0$.

Figure 12:
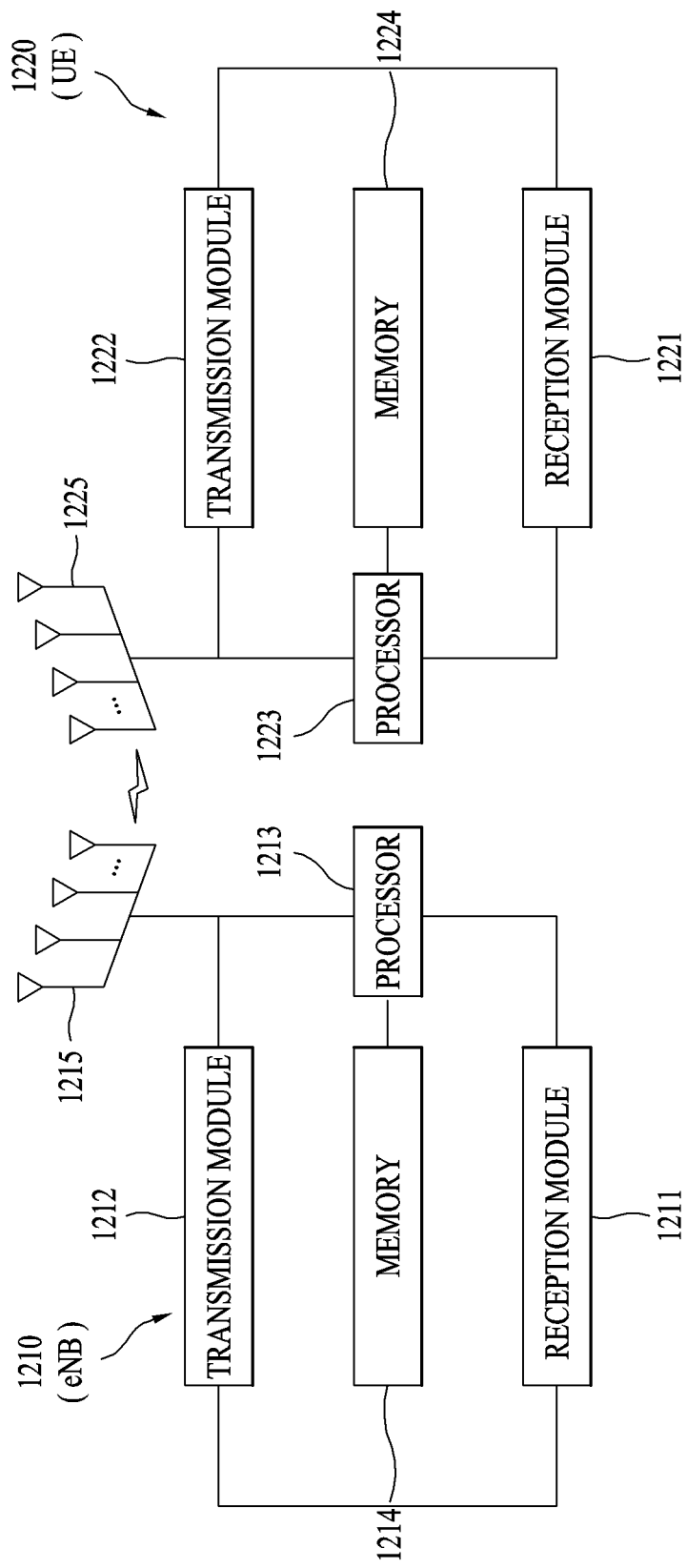
FIG. 12 is a diagram showing the configuration of transmission and reception apparatuses.

Configuration of an Apparatus According to an Embodiment of the Present Invention FIG. 12 is a diagram showing the configuration of a transmission point apparatus and a UE apparatus according to an embodiment of the present invention.

Referring to FIG. 12, the transmission point apparatus 1210 according to the present invention may include a reception module 1211, a transmission module 1212, a processor 1213, a memory 1214 and a plurality of antennas 1215. Since the plurality of antennas 1115 is used, the transmission point apparatus may support MIMO transmission/reception. The reception module 1211 may receive a variety of signals, data and information from the UE on uplink. The transmission module 1212 may transmit a variety of signals, data and information to the UE on downlink. The processor 1213 may control the overall operation of the transmission point apparatus 1210.

The processor 1213 of the transmission point apparatus 1210 according to one embodiment of the present invention may process the operations necessary for the above-described embodiments.

The processor 1213 of the transmission point apparatus 1210 may process information received by the transmission point apparatus 1210 and information to be transmitted to an external device and the memory 1214 may store the processed information for a predetermined time and may be replaced by a component such as a buffer (not shown).

Referring to FIG. 12, the UE apparatus 1220 according to the present invention may include a reception module 1221, a transmission module 1222, a processor 1223, a memory 1224 and a plurality of antennas 1225. Since the plurality of antennas 1225 is used, the UE apparatus may support MIMO transmission/reception. The reception module 1225 may receive a variety of signals, data and information from the eNB on downlink. The transmission module 1222 may transmit a variety of signals, data and information to the eNB on uplink. The processor 1223 may control the overall operation of the UE apparatus 1220.

The processor 1223 of the UE apparatus 1220 according to one embodiment of the present invention may process the operations necessary for the above-described embodiments.

The processor 1223 of the UE apparatus 1220 may process information received by the UE apparatus 1220 and information to be transmitted to an external device and the memory 1214 may store the processed information for a predetermined time and may be replaced by a component such as a buffer (not shown).

In the above-described detailed configuration of the transmission point apparatus and the UE apparatus, details of the above-described various embodiments of the present invention may be independently applied or 2 or more embodiments may be applied at the same time. In this case, overlapping details will be omitted from the description for simplicity and clarity.

Furthermore, in the description of FIG. 12, the description of the transmission point apparatus 1210 may also be equally applied to a device functioning as a downlink transmission entity or an uplink reception entity. The description of the UE apparatus 1220 may also be equally applied to a relay station device functioning as an uplink transmission entity or a downlink reception entity.

The embodiments of the present invention can be implemented by a variety of means, for example, hardware, firmware, software, or a combination thereof.

In the case of implementing the present invention by hardware, the present invention can be implemented with application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so as to be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Additionally, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

INDUSTRIAL APPLICABILITY

The above-described embodiments of the present invention are applicable to various mobile communication systems.

The invention claimed is:

1. A method for transmitting an acknowledgement for an enhanced physical downlink control channel (EPDCCH) at a user equipment (UE) in a wireless communication system, the method comprising:
receiving the EPDCCH;
deciding a resource to be used to transmit the acknowledgement based on one or more of a value related to a lowest enhanced control channel element (ECCE) index among ECCEs used to transmit the EPDCCH, an antenna port index and a predetermined offset value indicated by downlink control information (DCI); and
transmitting the acknowledgement by using the resource,
wherein whether the predetermined offset value is used when deciding the resource is determined according to one or more of a type of the transmitted EPDCCH, a size of a DCI format, information related to an EPDCCH physical resource block (PRB) set on which the EPDCCH is transmitted, and a type of a signal transmitted on a PDSCH indicated by the EPDCCH, and
wherein, if the size of the DCI format is greater than the predetermined offset value, the predetermined offset value is used when deciding the resource.

2. The method according to claim 1, wherein the predetermined offset value is any one of values mapped to values of a specific field included in the DCI.

3. The method according to claim 2, wherein, if the predetermined offset value is used when deciding the resource, the mapped values are differently set according to one or more of an aggregation level and an antenna port index.

4. The method according to claim 3, wherein the values mapped to the values of the specific field when the aggregation level is large or when the antenna port index is large include negative values greater in number than a number of negative values included in the values mapped to the values of the specific field when the aggregation level is small or when the antenna port index is small.

5. The method according to claim 1, wherein, if the predetermined offset value is used when deciding the resource, the value of the lowest ECCE index is a quotient of the lowest ECCE index divided by an aggregation level.

6. The method according to claim 1, wherein, if the predetermined offset value is not used when deciding the resource, the value of the lowest ECCE index is a product of a quotient of the lowest ECCE index divided by an aggregation level and a number of ECCEs per PRB pair.

7. The method according to claim 1, wherein, if the EPDCCH PRB set is a distributed type, the predetermined offset value is used when deciding the resource.

8. The method according to claim 1, wherein information related to the EPDCCH PRB includes an aggregation level or a number of PRB pairs.

9. The method according to claim 8, wherein, if the aggregation level or the number of PRB pairs is greater than the predetermined offset value, the predetermined offset value is used when deciding the resource.

10. The method according to claim 1, wherein, if the type of the signal transmitted on the PDSCH is any one of system information, a paging signal or a random access response, the predetermined offset value is not used when deciding the resource.

11. The method according to claim 1, wherein the resource is decided by the following equation:

$$n_{PUCCH}^{(1)} = N_{PUCCH,n}^{(1)} + f_1(n_{ECCE}) + \delta_{AP} \times k_P + \delta_{ARI} \times n_{ARI}$$

where, $N_{PUCCH,n}^{(1)}$ denotes a start point of a resource index which will be used to transmit the PUCCH for the EPDCCH, $n_{ECCE}$ denotes the lowest ECCE index, $f_1(n_{ECCE})$ denotes the value related to the lowest ECCE index, $k_P$ denotes the antenna port index, $\delta_{AP}$ denotes a value for determining whether the antenna port index is used, $n_{ARI}$ denotes the predetermined offset value, and $\delta_{ARI}$ denotes a value for determining whether the predetermined offset value is used.

12. A user equipment (UE) apparatus for transmitting an acknowledgement for an enhanced physical downlink control channel (EPDCCH) in a wireless communication system, the UE apparatus comprising:
- a reception module; and
- a processor,
- wherein the processor receives the EPDCCH and decides a resource to be used to transmit the acknowledgement based on one or more of a value related to a lowest enhanced control channel element (ECCE) index among ECCEs used to transmit the EPDCCH, an antenna port index and a predetermined offset value indicated by downlink control information (DCI), and transmits the acknowledgement by using the resource,
- wherein whether the predetermined offset value is used when deciding the resource determined according to one or more of a type of the transmitted EPDCCH, a size of a DCI format, information related to an EPDCCH physical resource block (PRB) set on which the EPDCCH is transmitted, and a type of a signal transmitted on a PDSCH indicated by the EPDCCH, and
- wherein, if the size of the DCI format is greater than the predetermined offset value, the predetermined offset value is used when deciding the resource.

13. The UE apparatus of claim 12, wherein the predetermined offset value is any one of values mapped to values of a specific field included in the DCI.

14. The UE apparatus of claim 12, wherein, if the predetermined offset value is used when deciding the resource, the value of the lowest ECCE index is a quotient of the lowest ECCE index divided by an aggregation level.

15. The UE apparatus of claim 12, wherein, if the predetermined offset value is not used when deciding the resource, the value of the lowest ECCE index is a product of a quotient of the lowest ECCE index divided by an aggregation level and a number of ECCEs per PRB pair.

16. The UE apparatus of claim 12, wherein, if the EPDCCH PRB set is a distributed type, the predetermined offset value is used when deciding the resource.

17. The UE apparatus of claim 12, wherein information related to the EPDCCH PRB set includes an aggregation level or a number of PRB pairs.

18. The method according to claim 17, wherein, if the aggregation level or the number of PRB pairs is greater than the predetermined offset value, the predetermined offset value is used when deciding the resource.

19. The UE apparatus of claim 12, wherein, if the type of the signal transmitted on the PDSCH is any one of system information, a paging signal or a random access response, the predetermined offset value is not used when deciding the resource.

20. The UE apparatus of claim 12, wherein the resource is decided by the following equation:

$$n_{PUCCH}^{(1)} = N_{PUCCH,n}^{(1)} + f_1(n_{ECCE}) + \delta_{AP} \times k_P + \delta_{ARI} \times n_{ARI}$$

where, $N_{PUCCH,n}^{(1)}$ denotes a start point of a resource index which will be used to transmit the PUCCH for the EPDCCH, $n_{ECCE}$ denotes the lowest ECCE index, $f_1(n_{ECCE})$ denotes the value related to the lowest ECCE index, $k_P$ denotes the antenna port index, $\delta_{AP}$ denotes a value for determining whether the antenna port index is used, $n_{ARI}$ denotes the predetermined offset value, and $\delta_{ARI}$ denotes a value for determining whether the predetermined offset value is used.

* * * * *